(12) United States Patent  
Möller

(10) Patent No.: US 6,287,063 B1  
(45) Date of Patent: Sep. 11, 2001

(54) SECURING DISK FOR INTERPOSITION BETWEEN TWO COMPONENT PARTS TO BE CONNECTED

(75) Inventor: Matthias Möller, Bünde (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/573,309

(22) Filed: May 18, 2000

(30) Foreign Application Priority Data

May 28, 1999 (DE) .......................................... 299 09 332 U  
Jan. 29, 2000 (DE) .......................................... 200 01 608 U

(51) Int. Cl.⁷ ............................. F16B 39/00; F16B 39/24
(52) U.S. Cl. ......................... 411/163; 411/135; 411/148; 411/160
(58) Field of Search ................................. 411/112, 113, 411/129, 131, 135, 148, 160, 161, 162, 163, 164, 165

(56) References Cited

U.S. PATENT DOCUMENTS

| | | | |
|---|---|---|---|
| 884,290 | * | 4/1908 | de Oca ............................. 411/161 X |
| 1,034,697 | * | 8/1912 | Darling ................................. 411/162 |
| 2,151,919 | * | 3/1939 | Jacobson ......................... 411/165 X |
| 3,481,381 | * | 12/1969 | Black .................................... 411/162 |
| 4,900,209 | * | 2/1990 | Reynolds ......................... 411/112 X |

* cited by examiner

Primary Examiner—Neill Wilson  
(74) Attorney, Agent, or Firm—Friedrich Kueffner

(57) ABSTRACT

A securing disk for interposition between two component parts to be connected has a disk member having a first face and a second face. The disk member has positive-locking bodies projecting from the first and second faces. Securing arms are connected to a circumferential edge of the disk member and project perpendicularly relative to the first face. The securing arms have integrated abutments.

7 Claims, 2 Drawing Sheets

SECURING DISK FOR INTERPOSITION BETWEEN TWO COMPONENT PARTS TO BE CONNECTED

BACKGROUND OF THE INVENTION

1. Field of the Invention

The invention relates to a securing disk for two component parts, in particular motor vehicle parts, to be fixedly connected to one another so as to prevent relative rotation, wherein the securing disk has a disk member with positive-locking bodies projecting in the direction toward the component parts.

2. Description of the Related Art

Motor vehicle component parts are subjected to great static and dynamic loads during operation. It is therefore mandatory that the motor vehicle component parts themselves and the mounting process are of high-quality, especially when the component parts are component parts of the suspension or the car body. In the case of motor vehicle component parts that are screwed to one another, it is thus required to provide a good and slip-safe coupling of the component parts.

In this context, different screw securing devices in the form of spring rings or retainer rings are known which are placed underneath the nut in order to prevent accidental loosening of the fastening screws. Such screw securing devices are designed to compensate creep and settling in order to prevent that the tension of the connection is reduced by unacceptable values. A rotation or slipping of two component parts connected to one another, in particular when the screw is guided with play through the bores in sheet metal, can be prevented by such screw securing devices only to a limited extent. When the component parts are subjected to greater dynamic loads, in particular of the vibrating kind, this holds true in the case of initial assembly as well as in the case of later use.

The German patent document 298 06 800 U1 discloses a securing disk for two component parts to be fixedly connected to one another so as to prevent relative rotation. The securing disk has positive-locking bodies comprised of steel balls received in cutouts of the disk member and projecting in the direction toward both component parts. When mounting the securing disk, the steel balls are pressed into the component parts. In addition to the frictional connection, this realizes an additional positive-locking action by generating a shearing surface. The securing disk thus acts as a coupling element which prevents a relative movement between the components after assembly.

Such a securing disk has been used with great success in practice. It is very well suited for various applications.

Frequently, the securing disks are pre-mounted on one of the component parts. This is advantageous in regard to an economic final assembly. In one prior art configuration of the securing disk, lateral flange portions of the disk member are provided with holes through which plastic nails or fasteners are driven into prepared bores of the component part. This is carried out manually by means of a striking tool.

However, this approach for pre-mounting is complex and cost-intensive. Moreover, the plastic nails after premounting can become loose and can fall out. A pre-mounted securing disk can thus be lost. Also, even after assembly of the components, the plastic nails can still become loose. This entails the risk that they can fall out completely or, when the component parts are hollow, they can fall into the hollow of the component parts, resulting in disadvantageous effects such as noise development etc.

SUMMARY OF THE INVENTION

It is an object of the present invention to improve a securing disk with respect to assembly-technological aspects as well as with regard to their functionality.

In accordance with the present invention, this is achieved in that at the circumferential edge of the disk member securing arms with integrated abutments are arranged which project substantially perpendicularly from the disk member.

By means of the securing arms the securing disk is inserted, when pre-mounting, into openings provided at a component part. The securing disk is thus automatically secured on the component. Additional means such as plastic nails are not required. This simplifies assembly considerably and results in a more economic assembly. The pattern of openings in the component parts to be connected remains unchanged.

According to an especially advantageous embodiment the securing arms are finger-like spring legs formed as a monolithic or integral part of the disk member. The spring legs project in the same direction from the disk member and are positioned expediently diametrically opposite one another.

The abutments on the securing arms can, in principle, have different configurations. One embodiment, which is especially advantageous in practical applications, provides that an abutment is formed by a lateral projection at the securing arm. Such a lateral projection is preferably located on the narrow sides of the securing arms positioned parallel to the longitudinal center axis of the disk member extending through the securing arms. The lateral projection is thus oriented transversely to the longitudinal center axis. In principle, the lateral projection could also be provided by a radially oriented, especially outwardly oriented, bulge on the securing arm.

Especially in combination with the feature that the securing arms are monolithic spring legs of the disk member, a reliable clamping-type securing action of the securing disk on a component part is provided. The previously observed accidental loosening and falling out of the securing disk upon a shaking movement during handling of the component parts is thus reliably prevented.

According to another embodiment of the invention, each one of the securing arms has an elongate slot extending in the longitudinal direction. This feature reinforces the spring-elastic properties of the securing arms and is advantageous during mounting of the securing disk. The securing arms can give or yield to a limited extent during insertion into the mounting openings. After passing through the mounting openings, the securing arms spring back laterally and secure the securing disk. In this context, it may also be advantageous to provide the securing arms each with two leg portions. The securing arm may be open toward its free end located opposite the disk member.

The insertion process is improved when the free end of the securing arms is of a rounded design.

The positive-locking bodies can be in the form of steel balls as they have been used successfully in practice. They are oversized relative to the cutouts in the disk member and are pressed into the cutouts.

A feature which is beneficial with regard to manufacturing is that the positive-locking bodies positioned on a partial circle are arranged asymmetrically relative to one another in relation to a plane of symmetry which extends through the securing arms as well as with respect to a plane of symmetry which is perpendicular (rotated by 90°) thereto. During manufacture of the securing disk in a continuous process on a manufacturing line, each steel ball to be mounted is positioned on its own longitudinal path so that the steel balls can be pressed into the securing disk sequentially. A simultaneous pressing action of two positive-locking bodies (steel balls) is thus not required, and this is beneficial with regard to manufacturing-technological aspects.

DESCRIPTION OF THE PREFERRED EMBODIMENTS

FIGS. 1 through 4 show a securing disk 1 according to the invention.

Figure 4:
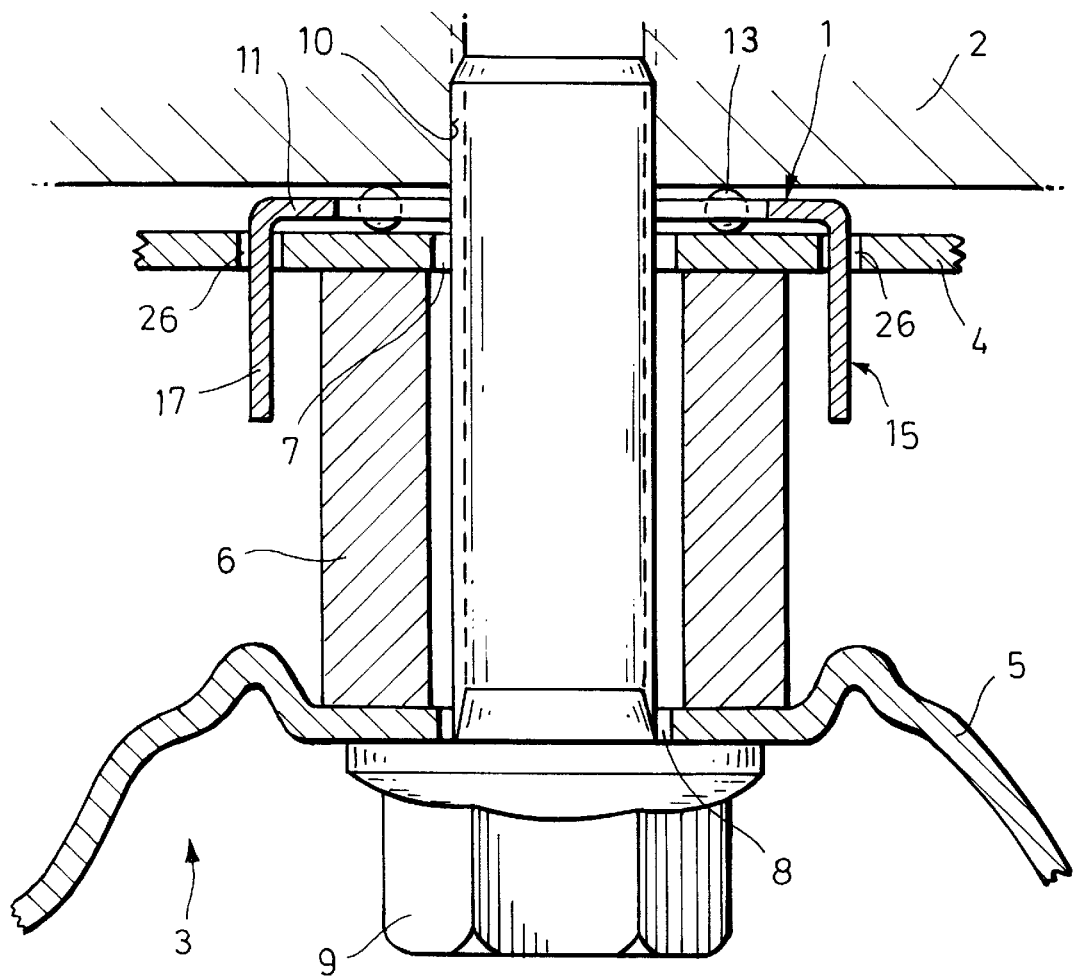
FIG. 4 shows a securing disk according to the invention in the assembly position between two component parts.

As illustrated in FIG. 4, the securing disk 1 is interposed between two component parts 2, 3 to be connected fixedly to one another so as to be secured against rotation and against slip. The component part 2 schematically illustrated in FIG. 4 is the floor of a motor vehicle. The component part 3 is a portion of an axle support. Reference numeral 4 indicates the upper half, and 5 indicates the lower half of the axle support 3. Between upper half 4 and lower half 5 a spacer bushing 6 is arranged. Moreover, the upper half 4 and the lower half 5 are provided with mounting openings 7, 8 for introducing a screw 9. The axle support 3 is connected to the floor 2 of the motor vehicle by means of the screw 9 which is guided through the mounting openings 7, 8 and the spacer bushing 6 into a threaded bore 10 at the floor 2 of the motor vehicle.

The securing disk 1 comprises a disk member 11 with a through opening 12 for the screw 9. The securing disk 1 has positive-locking bodies in the form of steel balls 13 which project from the faces of the disk member 11 in the direction of the floor 2 of the motor vehicle as well as in the direction toward the upper half 4 of the axle support 3. The steel balls 13 are pressed into cutouts 14 of the disk member 11.

At the circumferential edge of the disk member 11 two perpendicularly projecting securing arms 15 with integrated abutments 16 are arranged. The securing arms 15 are positioned diametrically opposite one another at the circumferential edge and are formed as monolithic or integral spring legs 17 of the disk member 11.

Figure 1:
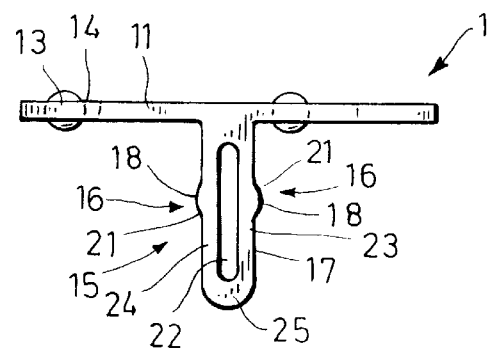
FIG. 1 shows a securing disk according to the invention in a side view onto a securing arm.

As can be seen in FIG. 1, each of the spring legs 17 has lateral projections 18 which act as abutments 16. The lateral projections 18 are positioned on the narrow sides 19, 20 of the spring legs 17 and have laterally rounded flanks 21. The securing arm 15 has an elongate slot 22 extending in the longitudinal direction of the securing arm 15 so that the spring legs 17 have two leg portions 23, 24. In the shown embodiment, the leg portions 23, 24 are connected by a rounded free end 25. By means of the rounded end 25 as well as by means of the spring-elastic yielding action of the leg portions 23, 24 mounting of the securing disk 1 is facilitated.

As can be seen in FIG. 4, the upper half 4 is provided with bores 26 to either side of the mounting opening 7. The securing arms 15 of the securing disk 1 are inserted into these bores 26 during pre-mounting. The spring legs 17, i.e., the leg portions 23, 24, yield laterally under pressure until the projections 18 have passed through the bores 26. The leg portions 23, 24 spring back (open up) and generate a clamping-type securing action. The securing disk 1 is reliably secured in its position on the axle support 3 and remains in this position until the axle support 3 is mounted to the vehicle floor 2. The securing disk 1 cannot fall out of the axle support 3 because of the abutments 16 on the securing arms 15.

Upon securing the axle support 3 on the vehicle floor 2 by means of the screw 9, the steel balls 13 will penetrate partially into the upper half 4 and the vehicle floor 2 by forming depressions therein. In this way, a positivelocking connection between the vehicle floor 2 and the axle support 3 by interposition and integration of the securing disk 1 is produced.

Figure 2:
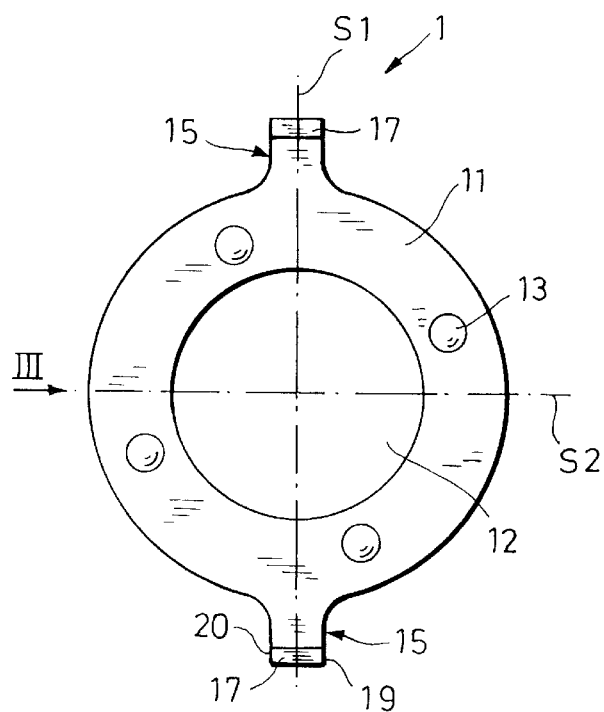
FIG. 2 is a plan view onto the securing disk according to FIG. 1.
Figure 3:
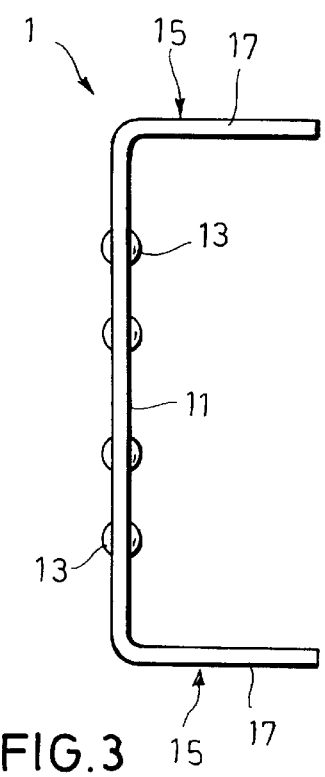
FIG. 3 is a view of the securing disk in the direction of arrow III of FIG. 2.

FIG. 2 illustrates that the steel balls 13 are positioned on a partial circle and, with respect to the planes of symmetry S1 and S2, are arranged asymmetrically to one another. This staggered arrangement is advantageous with respect to the manufacture of the securing disk because the steel balls 13 can be sequentially pressed into the securing member 11 on a manufacturing line.

While specific embodiments of the invention have been shown and described in detail to illustrate the inventive principles, it will be understood that the invention may be embodied otherwise without departing from such principles.

What is claimed is:

1. A securing disk for interposition between two component parts to be connected, the securing disk comprising:
    a disk member having a first face and a second face;
    the disk member comprising positive-locking bodies projecting from the first and second faces;
    securing arms connected to a circumferential edge of the disk member and projecting perpendicularly relative to the first face;
    the securing arms having integrated abutments, wherein the securing arms have lateral projections forming the abutment.

2. The securing disk according to claim 1, wherein the securing arms are spring legs formed as monolithic parts of the disk member.

3. A securing disk for interposition between two component parts to be connected, the securing disk comprising:
    a disk member having a first face and a second face;
    the disk member comprising positive-locking bodies projecting from the first and second faces;
    securing arms connected to a circumferential edge of the disk member and projecting perpendicularly relative to the first face;
    the securing arms having integrated abutments, wherein each one of the securing arms has an elongate slot extending in a longitudinal direction of the securing arm.

4. A securing disk for interposition between two component parts to be connected, the securing disk comprising:
    a disk member having a first face and a second face;
    the disk member comprising positive-locking bodies projecting from the first and second faces;
    securing arms connected to a circumferential edge of the disk member and projecting perpendicularly relative to the first face;
    the securing arms having integrated abutments, wherein each one of the securing arms is comprised of two leg portions.

5. The securing disk according to claim 1, wherein each of the securing arms has an end opposite the disk member and wherein the end is rounded.

6. A securing disk for interposition between two component parts to be connected, the securing disk comprising:

a disk member having a first face and a second face;

the disk member comprising positive-locking bodies projecting from the first and second faces;

securing arms connected to a circumferential edge of the disk member and projecting perpendicularly relative to the first face;

the securing arms having integrated abutments, wherein the disk member has cutouts and wherein the positive-locking bodies are steel balls pressed into the cutouts.

7. A securing disk for interposition between two component parts to be connected, the securing disk comprising:

a disk member having a first face and a second face;

the disk member comprising positive-locking bodies projecting from the first and second faces;

securing arms connected to a circumferential edge of the disk member and projecting perpendicularly relative to the first face;

the securing arms having integrated abutments, wherein the disk member has a plane of symmetry extending perpendicularly to the disk member through the securing arms and a second plane of symmetry rotated 90° to the first plane of symmetry and extending perpendicularly to the disk member, wherein the positive-locking bodies are arranged asymmetrically relative to the first and second planes of symmetry.

* * * * *